United States Patent [19]
Taylor

[11] Patent Number: 6,020,863
[45] Date of Patent: *Feb. 1, 2000

[54] MULTI-MEDIA PROCESSING SYSTEM WITH WIRELESS COMMUNICATION TO A REMOTE DISPLAY AND METHOD USING SAME

[75] Inventor: Ronald T. Taylor, Grapevine, Tex.

[73] Assignee: Cirrus Logic, Inc.

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,806

[22] Filed: Feb. 27, 1996

[51] Int. Cl.[7] .............................. G09G 5/00; H04N 7/00
[52] U.S. Cl. ............................................. 345/3; 348/552
[58] Field of Search ...................... 345/2, 3, 1, 156–169, 345/115, 116; 395/326, 327, 328; 463/40; 364/705.05; 348/584, 585, 588, 589, 590

[56] References Cited

U.S. PATENT DOCUMENTS

| | | | |
|---|---|---|---|
| 4,337,480 | 6/1982 | Bourassin et al. | 348/552 |
| 4,422,105 | 12/1983 | Rodesch et al. | 345/328 |
| 4,760,387 | 7/1988 | Ishii et al. | 348/3 |
| 4,896,347 | 1/1990 | Auber | 348/13 |
| 4,926,166 | 5/1990 | Fujisawa et al. | 345/3 |
| 4,989,081 | 1/1991 | Miyagawa et al. | 348/61 |
| 5,089,811 | 2/1992 | Leach | 348/552 |
| 5,111,296 | 5/1992 | Duffield et al. | 348/552 |
| 5,245,553 | 9/1993 | Tanenbaum | 345/329 |
| 5,247,347 | 9/1993 | Litteral et al. | 348/7 |
| 5,283,819 | 2/1994 | Glick et al. | 379/93.01 |
| 5,307,055 | 4/1994 | Baskin et al. | 345/1 |
| 5,404,393 | 4/1995 | Remillard | 379/93.25 |
| 5,434,590 | 7/1995 | Dinwiddie, Jr. et al. | 345/115 |
| 5,488,385 | 1/1996 | Singhal et al. | 345/3 |
| 5,493,638 | 2/1996 | Hooper et al. | 345/435 |
| 5,574,574 | 11/1996 | Kawamura | 345/1 |
| 5,594,509 | 1/1997 | Florin et al. | 348/731 |
| 5,602,597 | 2/1997 | Bertram | 348/565 |
| 5,606,344 | 2/1997 | Blaskey et al. | 345/2 |
| 5,629,733 | 5/1997 | Youman et al. | 348/13 |
| 5,721,829 | 2/1998 | Dunn et al. | 348/7 |
| 5,805,117 | 9/1998 | Mazurek et al. | 345/1 |
| 5,831,664 | 11/1998 | Wharton et al. | 345/1 |

OTHER PUBLICATIONS

Apr. 3, 1996 *The Wall Street Journal*, Technology Section: "When a TV Joins a PC, Will Anybody Be Watching?".

Time Digital Magazine, Lifestyle Section "But Does It Match The Curtains?" by Nicholas Von Hoffman, pp. TD54–57.

*Primary Examiner*—Jeffery Brier
*Assistant Examiner*—Paul A. Bell
*Attorney, Agent, or Firm*—James J. Murphy, Esq.; Steve Shaw

[57] ABSTRACT

A display control system (200) for transferring video and graphical data processed in a first processing device (201) having a dedicated display screen to a second processing device (202) for display on the screen (152) of a conventional television set (150). The first processing device (201) and the second processing device (202) communicate by means of a pair of optical driver/receivers (203, 207). The second processing device (202) captures selected frames from a broadcast television picture displayed on the screen (152) of the television (150) and transmits the captured frames to the first processing device (201) for storage or display on the dedicated display screen.

29 Claims, 2 Drawing Sheets

MULTI-MEDIA PROCESSING SYSTEM WITH WIRELESS COMMUNICATION TO A REMOTE DISPLAY AND METHOD USING SAME

TECHNICAL FIELD OF THE INVENTION

The present invention relates in general to data processing systems and, in particular, to processing systems with wireless ports for communication with remote display devices and methods using the same.

BACKGROUND OF THE INVENTION

The type and number of image processing innovations being developed in the telecommunications and personal computer fields continue to grow rapidly. In particular, significant efforts are being made to develop advanced multi-media communication systems for use in the home. The prevailing consensus in industry is that success of these multi-media innovations will be achieved by adding processing capability to ordinary television sets. The most likely implementation of this processing capability will be to use a "set top box" that provides for interactive communications between the user and the television set and that executes a variety of software programs for processing data during the course of such exchanges. Further, the set top box will also most likely incorporate processing sub-systems able to transmit and receive audio and video data over cable television lines and/or telephone lines serving the home. Finally, the set top box may also execute more routine computer application software, such as word processing and spread sheets.

At the same time, many new technologies have been developed that incorporate multi-media and TV signal processing capabilities into standard personal computer systems. These technologies enable personal computers (PCs) to display full-motion video, audio, and music retrieved from CD-ROM, or to demodulate standard broadcast signals, such as NTSC, PAL, or SECAM signals, and display the TV picture within a window on the screen of the PC monitor.

Presently, development of both the "set top box" multi-media systems and the PC-based innovations have encountered significant problems, including the high cost and complexity of the hardware used and the fact that both technologies are somewhat redundant. Specifically, currently available PC-based systems generally require the use of costly, space-consuming video cards to process a received video signal. Further, the video frames are generally restricted to display in a window within the background (graphics) display on the PC display screen. Due to the generally small size of PC monitor screens, especially laptop PC screens, and the even smaller size of the window in which the video frames must be displayed, this method of displaying a video picture is less than desirable. Among other things, there is a substantial loss of detail in the picture and the small window sizes make viewing the TV picture difficult from anything other than a short distance.

Additionally, multi-media systems that use full-motion video images retrieved from CD-ROM are adversely effected by the bandwidth limitations of the CPU and/or the internal busses of the PC. Some multi-media systems attempt to minimize these bandwidth limitations by using compression algorithms which update or change only a part of the image at a time. Other applications attempt to overcome the bandwidth limitations by using less frames per second to form the image, which often results in a tearing in the video display.

The "set top box" approach to multi-media systems and interactive television is also limited in that current "set top box" designs generally only contain the minimum hardware necessary to perform certain application-specific tasks, such as two-way communication across telephone lines for home shopping or home banking applications. Present "set top box" proposals lack the more powerful general-purpose processing capabilities inherent in PC systems. Upgrading the capability of a "set top box" by incorporating devices such as CD-ROM drives, better CPUs and more memory, would substantially increase hardware costs. In fact, as more and more hardware is added, the "set top box" more closely resembles a personal computer than a simple control device for interactive applications and/or video games.

Therefore, a need has arisen for electronic devices and systems capable of executing multi-media applications that are low cost, require a minimum amount of hardware, and that display processed video images on large screen television sets. There is a further need for electronic devices and systems that enable small portable computers to use the large screen of a conventional television set for the display of text and data during the execution of computer applications, such as word processing and spread sheet programs.

SUMMARY OF THE INVENTION

The principles of the present invention are embodied in a display control system for displaying an image on a selected display device, the display control system comprising a first data processing device comprising a first image processor for receiving input data and, in response to the input data, generating first pixel data operable to form a first image on a first display device associated with the first data processing system and generating display update data operable to modify a portion of the first image and a first communication port coupled to the first image processor for transmitting the first pixel data and the display update data. The display control system further comprises a second data processing device comprising a second communication port for receiving the transmitted first pixel data and the transmitted display update data and a second image processor coupled to the second communication port and receiving from the second communication port the transmitted first pixel data and the transmitted display update data and, in response to the transmitted first pixel data, forming on the selected display device a second image substantially similar to the first image and, in response to the transmitted display update data, modifying a portion of the second image corresponding to the modified portion of the first image.

In another embodiment of the present invention, a display control system is provided for displaying an image on a selected display device, the display control system comprising a first data processing device comprising an image processor for receiving input data and, in response to the input data, generating pixel data defining a display image and a communication port coupled to the image processor for transmitting the pixel data. The display control system further comprises a second data processing device comprising a communication port for receiving the pixel data transmitted by the communication port of the first processing device and an image processor coupled to the communication port for displaying on the selected display device an image defined by the pixel data.

In still another embodiment of the present invention, a method is provided, in a display control system comprising 1) a first data processing device operable to display a first image on a screen of a first display device and 2) a second data processing device operable to control a display of a second display device, for transmitting the first image from the first processing device to the second display device. The method comprises the steps of: 1) generating in the first data processing device first pixel data operable to form the first image on the screen of the first display device; 2) transmitting the first pixel data via a first communication port in the first data processing device to a communication port in the second data processing device; 3) generating in the second data processing device from the first pixel data second pixel data operable to form a second image on the screen of the second display device, wherein the second image is substantially similar to the first image; 4) generating in the first data processing device display update data operable to modify a portion of the first image; 5) transmitting the display update data via the first communication port to the communication port; and 6) in response to the transmitted display update data, modifying the second pixel data, the modification of the second pixel data operable to modify a portion of the second image corresponding to the modified portion of the first image.

The foregoing has outlined rather broadly the features and technical advantages of the present invention in order that the detailed description of the display control system that follows may be better understood. Additional features and advantages of the display control system will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
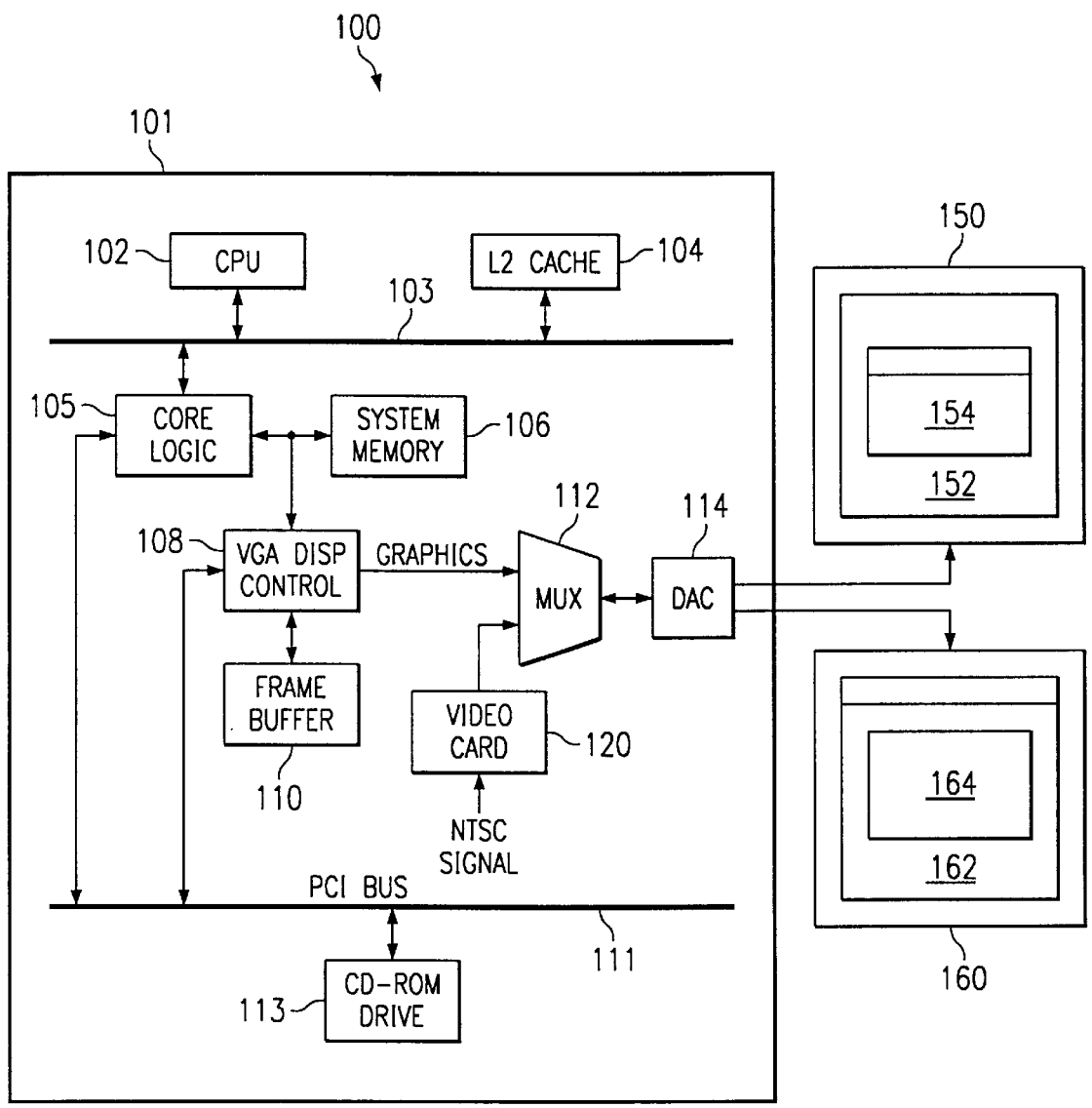
FIG. 1 is a functional block diagram of a personal computer operable to run multimedia programs and process RF television signals in accordance with the prior art.
Figure 2:
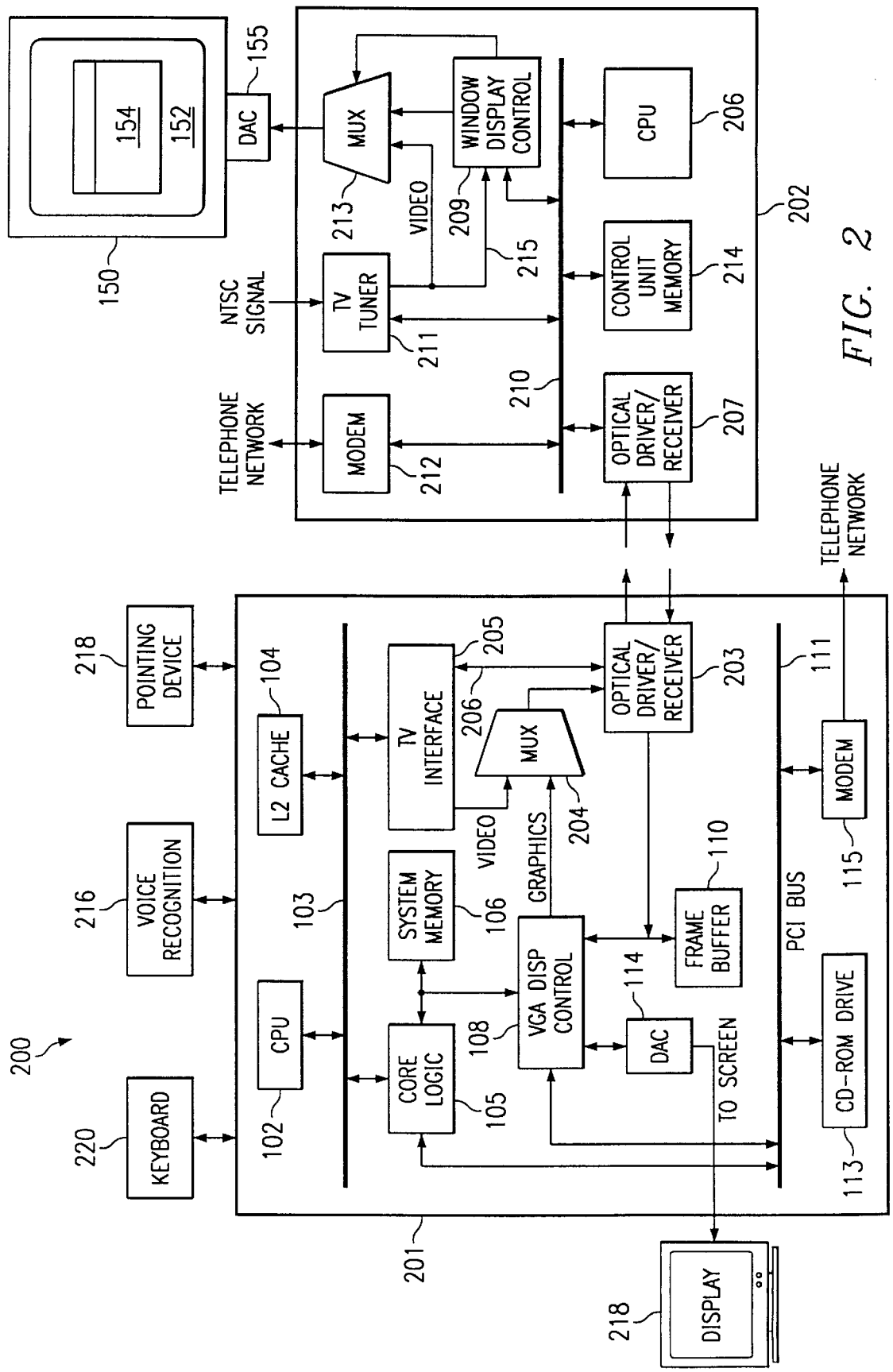
FIG. 2 is a functional block diagram of an exemplary personal computer operable to run multimedia programs and process RF television signals in accordance with the teachings of the present invention.

The principles of the present invention and their advantages are best understood by referring to the illustrated embodiment depicted in FIGS. 1 and 2 of the drawings, in which like numbers designate like parts.

FIG. 1 is a high level functional block diagram of a data processing system 100 in accordance with the prior art. System 100 includes a personal computer (PC) 101, which includes central processing unit (CPU) 102, CPU local bus 103, external L2 cache 104, core logic 105, system memory 106, VGA display controller 108, frame buffer 110, and digital-to-analog converter (DAC) 114.

PC 101 typically displays data on screen 162 of monitor 160, which data may include a video image in window 164 on screen 162. Alternatively, PC 101 may use a standard television set as an output display device, such as by displaying data in a window 154 on screen 152 of television 150.

CPU 102 is the "master" which controls the overall operation of PC 101. Among other things, CPU 102 performs various data processing functions and determines the content of the graphics data to be displayed on the display screen in response to user commands and/or the execution of application software. CPU 102 may be, for example, a general purpose microprocessor, such as an Intel Pentium class microprocessor or the like, used in commercial personal computers. CPU 102 communicates with the remainder of PC 101 via CPU local bus 103, which may be, for example, a special bus or a general bus (common in the industry).

CPU 102 can directly communicate with core logic 105 or through an external L2 cache 104. It should be noted that CPU 102 can also include on-board cache, typically up to 16 kilobytes. Core logic 105, under the direction of CPU 102, controls the exchange of data, addresses, control signals and instructions between CPU 102, display controller 108, and system memory 106. Core logic 105 may be any one of a number of commercially available core logic chip sets designed for compatibility with the remainder of the system and, in particular, with CPU 102. Core logic 105 generally: interfaces CPU 102 with the address path and data path of CPU bus 103; maintains cache memory, including the cache tags, set associative cache tags and other data necessary to insure cache coherency; performs cache "bus snooping"; generates the control signals required for DRAMs in the system memory or cache; and controls general management transactions; issues cycle completion responses to CPU 102; arbitrates for the data path of bus 103; and, when necessary, aborts operations if their cycles are incomplete.

Display controller 108 may be any one of a number of commercially available VGA display controllers. Display controller 108 may receive data, instructions and/or addresses from CPU 102, either through core logic 105 or directly from CPU 102 via CPU local bus 103. Data, instructions, and addresses are exchanged between display controller 108 and system memory 106 through core logic 105. Further, addresses and instructions may be exchanged between core logic 105 and display controller 108 via a local bus, which may be, for example, a PCI bus 111. Generally, display controller 108 controls screen refresh, executes a limited number of graphics functions, such as line draw, polygon fill, color space conversion, display data interpolation and zooming, and video streaming, and handles other ministerial chores such as power management. Most importantly, display controller 108 controls the raster of pixel data from frame buffer 110 to the PC display screen during screen refresh and interfaces CPU 102 and frame buffer 110 during display data update. In some embodiments of the prior art, video data may be directly input into display controller 108 (connection not shown).

Multiplexer 112 receives digital data from display controller 108 and outputs the data to DAC 114, which converts the digital data to analog signals that drive display 162 of monitor 160. Depending on the specific implementation of PC 101, DAC 114 may also include a color palette, YUV-to-RGB format conversion circuitry, and/or X- and Y- zooming circuitry, to name a few options. Monitor 160 may be, for example, a CRT unit, a liquid crystal display, electroluminescent display, plasma display, or any other type of display device which displays images on a screen as a plurality of pixels. A switchable output on DAC 114 enables PC 101 to display data on the larger screen 152 of television 150 instead of screen 162 of monitor 160.

Multiplexer 112 also receives a video IF signal from video card 120. Video card 120 receives a standard television signal, such as NTSC, PAL or SECAM, either from an antenna or a cable source, and demodulates and digitizes the RF signal to produce a video IF signal in digital format. Alternatively, video card 120 may receive an already demodulated video IF signal from a VCR. In this case, video card 120 simply converts the video IF signal received from the VCR to digital format. In either case, when CPU 102 selects the video signal from video card 120 for display on monitor 160 or television 150, the digitized IF signal and the graphics data from display controller 108 are selectively switched, typically as a function of current screen position of the raster scan, through multiplexer 112 and DAC 114 under the control of display controller 108 to generate a video image in window 164 of screen 162 or window 154 on screen 152.

The data paths in PC 101 will vary with each design. For example, PC 101 may be a "64-bit" or "72-bit" system. Assume for discussion purposes that a 64-bit system is chosen. Then, each of the data connections, including the data paths of CPU bus 103, the data paths through core logic 105 to system memory 106 and display controller 108, and the data interconnection between display controller 108 and frame buffer 110, are all 64 bits wide. It should be noted that the address interconnections will vary depending on the size of the memory and such factors as the need to support data byte select and virtual memory operations. In a Pentium processor system, the address portions of CPU bus 103 and PCI bus 111 are typically on the order of 30 bits wide.

Multimedia applications are executed by CPU 102 of PC 101 by retrieving video frames from CD ROM drive 113 coupled to PCI bus 111 and downloading the video frames through display controller 108. The video frames are usually stored in compressed format, such as MPEG video format, and are processed by CPU 102 and display controller 108 before being sent to DAC 114.

Although PC 101 in FIG. 1 can display data on both monitor 160 or television 150, a hardwired connection is required for television 150 and, if PC 101 is not a laptop model, a separate hardwired connection is required for monitor 160. Even if PC 101 is a laptop model, a user may not readily move PC 101 from one room to another without connecting and disconnecting PC 101 to a different television in each room. Additionally, when a user wants to view a different channel on television 150, the remote control or manual controls of television 150 must be used to change the background picture on screen 152.

FIG. 2 is a high level functional block diagram of communications/processing system 200 embodying the principles of the present invention. System 200 includes a laptop or hand held personal computer (PC) 201 and television control unit 202 for displaying data on television 150. For the purpose of clarity and brevity, the description below will discuss an implementation of the present invention in a personal computer, since the advantages of the present invention are optimized in a personal computer, particularly a portable computer such as a laptop PC. However, it should be obvious to one skilled in the art that the present invention may be incorporated in different types of data processing systems, including desktop and notebook personal computers.

Laptop PC 201 includes a central processing unit (CPU) 102, CPU local bus 103, external L2 cache 104, core logic 105, VGA display controller 108, system memory 106, digital-to-analog converter (DAC) 114, and frame buffer 110. Laptop PC 201 also includes a display screen as an integral part of laptop PC 201, rather than as a separate display device. The laptop display screen is not shown since, as will described below, the primary display used by PC 201 in a user's home is screen 152 of television 150.

DAC 114 receives digital data from display controller 108 and outputs analog signal data to drive the laptop display screen. DAC 114 may be integrated with display controller 108 onto a single chip. The laptop display screen may be, for example, a liquid crystal display, or any other type of flat display device which displays images on a screen as a plurality of pixels. Video card 120 is not incorporated in PC 201, since it will generally be preferable to view a video image from an antenna or a VCR on the large screen 152 of television 150, and television 150 already contains the hardware necessary for processing and viewing the video image.

When the PC user chooses to view graphics or video on a larger screen than the PC display screen, PC 201 may switch the video or graphics data to window 154 on screen 152 of television 150 by transmitting the display data to television control unit 202 via optical driver-receiver 203. Under the control of CPU 102, multiplexer 204 switches the digital display data output of display controller 108 to the input of optical driver-receiver 203. CPU 102 also sends control information and commands needed by television control unit 202 via optical driver-receiver 203. TV interface 205 receives the control information and commands from CPU 102 and sends them across data line 206 to optical driver-receiver 203. Likewise, when data is transmitted from television control unit 202 to CPU 102 of PC 201, optical driver-receiver 203 sends the data to TV interface 205 via data line 206.

Optical driver-receiver 203 provides a high-speed infrared (IR) communication link with a corresponding optical driver-receiver 207 in TV control unit 202. The control information and commands sent by CPU 102 are used by CPU 208 of television control unit 202 to activate window 154 on screen 152 and to size and position window 154. CPU 208 controls window display controller 209, which receives from bus 210 the display data used to update window 154. TV control unit 202 may be an integral part of television 150 or a separate stand-alone control device.

The mode of operation described above involves the transfer of an entire frame of display data from PC 201 to TV control unit 202. This requires a large amount of bandwidth even if only minor incremental changes are being made to the PC display, as when a document is being typed/edited in a word processing application. This limits the rate at which new display frames for window 154 can be received from PC 201. In a preferred embodiment of the present invention, PC 201 conserves bandwidth by transmitting an initial frame of data in its entirety and then updating only the changed portions of subsequent frames.

This is accomplished by transmitting from VGA display controller 108 the graphics control data that VGA display controller 108 generated from the commands received from CPU 102 and that VGA display controller 108 uses to update portions of the PC display screen. The graphics control data is transmitted through optical driver-receiver 203 and received by optical driver-receiver 207. In a preferred embodiment of the present invention, window display controller 209 is compatible with VGA display controller 108 and uses the transmitted graphics control data to update a corresponding portion of window 154 on screen 152, thereby producing the same image that VGA display controller 108 produces on the laptop PC display screen.

To ensure continued image integrity between the image on the laptop PC display screen and the image in window 154, PC 201 periodically transmits an entire frame to TV control device 201, followed by subsequent graphics control data used to update portions of the newly transmitted frame. The periodic transmission of entire frames corrects display errors in window 154 that result from intermittent data transmission errors that may occur between PC 201 and TV control unit 202.

For example, if keyboard inputs 220, voice recognition device inputs 216, or computer pointing device inputs 217, such as from a mouse, joystick or touchpad, are entered by a user of PC 201 after an entire frame has been transmitted to TV control unit 202, graphics controller 108 converts the user input data into graphics control data that is used to update the portion of the laptop display screen where a character entered by the keyboard 220 is supposed to appear or where the cursor is changing position. The same graphics control data is then transferred through multiplexer 204 to optical driver/receiver 203 for transmission to TV control unit 202. The received graphics control data, which has a much narrower bandwidth requirement than the corresponding pixel data, is used by window display controller 209 to modify the content of window 154.

As in the prior art, PC 201 can retrieve video data from CD ROM 113 for display on the laptop PC screen. If the video data is in compressed format, such as MPEG, the data may be "uncompressed" by CPU 102, or by VGA display controller 108. Alternatively, in a preferred embodiment, PC 201 may directly download video data from CD-ROM drive 113 through core logic 105, TV interface 205 and multiplexer 204 to optical driver-receiver 203. The uncompressed or, preferably, compressed video data is then transmitted across the IR link to optical driver-receiver 207 in television control unit 202. CPU 208 will then uncompress and route, or simply route, the received data to window display control 209. In this manner, full motion video from a multimedia application may be viewed in the larger window 154 of screen 152 instead of in the small display space of the laptop PC.

When operating in normal television mode, television control unit 202 receives a standard television signal, such as an NTSC signal, from an antenna or cable source on the input of TV tuner 211. TV Control information, such as channel, volume level and/or contrast are received via optical driver/receiver 207 from PC 201 or a conventional remote control. TV tuner 211 demodulates the received RF signal and produces a digitized video signal. Alternatively, TV tuner 211 may receive a video signal from a VCR. Multiplexer 213 selects the output of TV tuner 211 and transmits the digital video data to a digital-to-analog converter (DAC) 155 in television 150. The DAC in television 150 drives screen 152 to produce the broadcast television images.

When television 150 is used as an alternate display for PC 201, the control information and display data received from PC 201 by optical driver-receiver 207 are transferred over bus 210 to window display controller 209, control unit memory 214, and CPU 208 of television control unit 202. Window display controller 209 causes multiplexer 213 to selectively switch between the video data received from TV tuner 211 and the video output of window display controller 209. Horizontal and vertical sync signals in the digital video output of TV tuner 211 are transferred to window display controller 209 via bus 215. Window display controller 209 uses the horizontal and vertical sync signals in the digital video output of TV tuner 211 to control the size and position of window 154 within the display space of screen 152. If data received from PC 201 is compressed MPEG data, the data may be "uncompressed" in CPU 208 or in window display controller 209.

Television control unit 202 transmits to PC 201 control unit status information and any necessary responses in a "handshaking" protocol. Additionally, television control unit 202 can transmit video data generated on the output of TV tuner 211 to PC 201. The video data may be transferred as single television frames or as sequences of low-speed television frames. Window display controller 209 captures individual lines of video data from TV tuner 211 and stores each line in control unit memory 214. CPU 208 and control unit memory 214 then transfer the captured frame to PC 201 via optical driver-receiver 207. The TV frame data are received by optical driver-receiver 203 and stored in frame buffer 110 in order to be displayed on the screen of PC 201. The TV frames may also be saved into system memory 106 by VGA display controller 108.

Window 154 is a user-defined window that may cover part or all of screen 152 of television 150. A television broadcast signal may be demodulated by TV tuner 211 and viewed on screen 152 while a smaller window 154 is overlaid on top of the television picture in order to display data from PC 201. This enables a user of PC 201 to, for example, operate a word processing program that edits a document displayed in window 154 while a television program fills the remainder of screen 152 of television 150.

Also shown in FIG. 2 are optional modem links between PC 201 and television control unit 202 to the public telephone network. Alternatively, a telephone line cord may directly connect modem 115 to modem 212 without any connection to the public telephone system. PC 201 can transmit and receive data through modem 115, including an MPEG video data stream. Likewise, television control unit 202 can transmit and receive data through modem 212, including an MPEG video data stream. When the modem option is implemented in PC 201 and TV control unit 202, PC 201 may use the telephone connection instead of the IR link to communicate with television control unit 202 in order to control the display of data in window 154. Additionally, the IR link may be replaced by a fiber-optic communication line. However, in a preferred embodiment of the present invention, an IR link is used in order to provide greater convenience/mobility over these physical wire connections.

In a preferred embodiment of the present invention, PC 201 provides all of the traditional remote control functions typically implemented in TV remote control devices, such as Power On/Off, Channel Up, Channel Down, Volume, Mute, etc. For example, PC 201 transmits channel selection commands to TV control unit 202, which demodulates the appropriate channel using TV tuner 211. Volume control commands may be sent to television 150 from PC 201 via multiplexer 213 and window display controller 209.

The system illustrated in FIG. 2 allows a user to run multimedia, word processing, spread sheet and other applications on the large screen of television 150 using the hardware of PC 201. This advantageously eliminates the need for expensive "docking ports" for PC 201 when a large monitor is needed. The system illustrated in FIG. 2 also eliminates the need to install a video card in PC 201 and instead relies on the TV tuner 211 of television control unit 202 in order to view a broadcast television signal on television 150. The present invention provides the advantage that the user may walk into the room where television 150 is located and select the screen 152 of television 150 as the display space for the multimedia, word processing, spreadsheet, or other application that is being run on laptop PC 201.

Although the present invention and its advantages have been described in detail, it should be understood that various changes, substitutions and alterations can be made herein without departing from the spirit and scope of the invention as defined by the appended claims.

What is claimed is:

1. A display control system for displaying an image on a first display device and a substantially similar image on a screen of a second display device, said display control system comprising:
    a first data processing device comprising:
        a first display controller operating in conjunction with a central processing unit and a memory for receiving input data and, in response to said input data, generating digital display data operable to form a first image on said screen of said first display device coupled to said first data processing system and generating display update data operable to modify a portion of said first image; and
        a first communication port coupled to said first display controller for transmitting said digital display data and said display update data; and
    a second data processing device comprising:
        a second communication port for receiving said transmitted digital display data and said transmitted display update data;
        a second display controller operating in conjunction with a central processing unit and a memory coupled to said second communication port and receiving from said second communication port said transmitted digital display data and said transmitted display update data and, in response to said transmitted digital display data, forming on said screen of said second display device a second image in a window substantially similar to said first image on said screen of said first display device and, in response to said transmitted display update data, modifying a portion of said second image; and
        a TV tuner for receiving a video signal and generating a background picture on said screen of said second display device, said window selectively overlaying at least a portion of said background picture.

2. The display control system in claim 1 wherein said first and second communication ports are optical driver-receivers for transmitting and receiving IR signals.

3. The display control system in claim 1 wherein said first and second communication ports are coupled together via a fiber-optic link.

4. The display control system in claim 1 wherein said first and second communication ports are coupled together via a telephone line.

5. The display control system in claim 1 wherein said input data are received from a keyboard coupled to said first data processing device.

6. The display control system in claim 1 wherein said input data are received from a tracking device coupled to said first data processing device.

7. The display control system in claim 1 wherein said input data are received from a stylus pad coupled to said first data processing device.

8. The display control system in claim 1 wherein said input data are received from a joystick or voice recognition device coupled to said first data processing device.

9. The display control system in claim 1 wherein said input data are received from a voice recognition device coupled to said first data processing device.

10. The display control system in claim 1 wherein said first data processing device further comprises a storage device and said input data comprises video data retrieved from said storage device.

11. The display control system in claim 1 wherein said first communication port receives video data in compressed format and transmits said compressed video data to said second communication port, and wherein said second image processor generates from said received compressed video data pixel data operable to form a video image on said second display device.

12. The display control system in claim 11 wherein said first communication port receives said video data from a source external to said first data processing device.

13. The display control system in claim 11 wherein said first communication port receives said video data from a storage device contained in said first data processing device.

14. The display control system in claim 1 wherein said second data processing device further comprises a television tuner for receiving an RF video signal and generating therefrom a processed video signal for display on said second display device.

15. The display control system in claim 14 wherein said second image processor captures selected frames of video data from said processed video signal and said second communication port transmits said captured selected frames to said first communication port of said first data processing system.

16. The display control system in claim 15 wherein said first communication port stores said selected frames transmitted from said second communication port and said first image processor displays said selected frames on said first display device.

17. In a display control system comprising a first data processing device including a controller operating in conjunction with a CPU and a memory device operable to display a first image on a screen of a first display device and a second data processing device including a controller operating in conjunction with a CPU and a memory operable to display a second substantially similar image in a window overlying at least a portion of a background picture on a screen of a second display device, a method of transmitting said first image from said first processing device to said second display device, the method comprising the steps of:
    generating in said first data processing device first digital display data operable to form said first image on said screen of said first display device;
    transmitting said first digital display data via a first communication port in said first data processing device to a comrnunication port in said second data processing device;
    generating the background picture from received video data using a television tuner,
    generating in said second data processing device from said first digital display second data operable to form a second image in the window on said screen of said second display device, wherein said second image is substantially similar to said first image;
    generating in said first data processing device digital display update data operable to modify a portion of said first image;
    transmitting said display update data via said first communication port to said communication port; and
    in response to said transmitted display update data, modifying said second data, said modification of said second data operable to modify a portion of said second image corresponding to said modified portion of said first image.

18. The method in claim 17 wherein said first and second commmunication ports are optical driver-receivers for transmitting and receiving IR signals.

19. A display control system for displaying an image on both first and second display devices, said display control system comprising:

a first data processing device comprising:
a first display controller operating in conjunction with a central processing unit for receiving input data and, in response to said input data, generating digital display data defining a first display image on said first display device; and
a first communication port coupled to said first display controller for transmitting said display data; and a second data processing device comprising:
a second communication port for receiving said digital display data transmitted by said first communication port of said first processing device;
a second display controller operating in conjunction with a central processing unit coupled to said second communication port for displaying on said second display device a second display image defined by said digital display data, said second display image disposed in a window overlying at least a portion of a video background picture; and
a TV tuner for generating said background picture.

20. The display control system in claim 19 wherein said communication ports of said first and second processing devices comprise optical driver-receivers for transmitting and receiving IR signals.

21. The display control system in claim 19 wherein said communication ports of said first and second processing devices are coupled together via a fiber-optic link.

22. The display control system in claim 19 wherein said input data are received from a keyboard coupled to said first data processing device.

23. The display control system in claim 19 wherein said input data are received from a mouse coupled to said first data processing device.

24. The display control system in claim 19 wherein said first data processing device further comprises a storage device and said input data comprises video data retrieved from said storage device.

25. The display control system in claim 19 wherein said communication port of said first data processing device receives video data in compressed format and transmits said compressed video data to said communication port of said second data processing device, and wherein said image processor of said second data processing device generates from said received compressed video data pixel data operable to form a video image on said second display device.

26. The display control system in claim 25 herein said communication port of said first data processing device receives said video data from a source external to said first data processing device.

27. The display control system in claim 25 wherein said communication port of said first data processing device receives said video data from a storage device contained in said first data processing device.

28. The display control system in claim 19 wherein said second data processing device further comprises a television tuner for receiving an RF video signal and generating therefrom a processed video signal for display on said second display device.

29. The display control system in claim 28 wherein said image processor of said second data processing device captures selected frames of video data from said processed video signal and said communication port of said second data processing device transmits said captured selected frames to said communication port of said first data processing device.

* * * * *